(12) United States Patent
Uchizono et al.

(10) Patent No.: US 11,492,508 B2
(45) Date of Patent: *Nov. 8, 2022

(54) INK JET PRINTING INK COMPOSITION AND INK JET PRINTING METHOD

(71) Applicant: Seiko Epson Corporation, Tokyo (JP)

(72) Inventors: Shunsuke Uchizono, Shiojiri (JP); Soichi Yamazaki, Shiojiri (JP); Hiroaki Kumeta, Matsumoto (JP); Manabu Taniguchi, Shiojiri (JP)

(73) Assignee: SEIKO EPSON CORPORATION

( * ) Notice: Subject to any disclaimer, the term of this patent is extended or adjusted under 35 U.S.C. 154(b) by 0 days.

This patent is subject to a terminal disclaimer.

(21) Appl. No.: 16/893,583

(22) Filed: Jun. 5, 2020

(65) Prior Publication Data

US 2020/0385593 A1    Dec. 10, 2020

(30) Foreign Application Priority Data

Jun. 7, 2019   (JP) .............................. JP2019-106838

(51) Int. Cl.
*C09D 11/38* (2014.01)
*B41M 5/00* (2006.01)
(Continued)

(52) U.S. Cl.
CPC ................ *C09D 11/38* (2013.01); *B41J 2/01* (2013.01); *B41J 2/2107* (2013.01); *B41M 5/0023* (2013.01); *C09D 11/322* (2013.01)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; C09D 151/08; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012;
(Continued)

(56) References Cited

U.S. PATENT DOCUMENTS 4,451,388 A    5/1984  Payne
5,925,178 A    7/1999  Martin et al.
(Continued)

FOREIGN PATENT DOCUMENTS

CN    102190929 A    9/2011
CN    102675962 A    9/2012
(Continued)

OTHER PUBLICATIONS

Extended European Search Report for Application No. EP 19 18 4730 dated Nov. 20, 2019 (5 pages).

*Primary Examiner* — Manish S Shah
(74) *Attorney, Agent, or Firm* — Harness, Dickey & Pierce, P.L.C.

(57) ABSTRACT

An ink jet printing ink composition contains a pigment, colloidal silica, trimethylglycine, and water, and in which a content of the colloidal silica is lower than or equal to a content of the trimethylglycine.

6 Claims, 1 Drawing Sheet

(51) Int. Cl.
*C09D 11/322* (2014.01)
*B41J 2/21* (2006.01)
*B41J 2/01* (2006.01)

(58) Field of Classification Search
CPC ............... B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41J 11/00; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; B41M 5/0076; G02B 5/20; G02B 5/223; C08K 3/11; C08K 2203/2237; C14C 11/006
See application file for complete search history.

(56) References Cited

U.S. PATENT DOCUMENTS

| | | | |
|---|---|---|---|
| 5,972,087 A | 10/1999 | Uraki et al. | |
| 6,039,796 A | 3/2000 | Kubota et al. | |
| 6,612,691 B1 | 9/2003 | Koitabashi et al. | |
| 8,460,450 B2 | 6/2013 | Taverizatshy et al. | |
| 8,740,368 B2 | 6/2014 | Ikoshi et al. | |
| 8,955,954 B2 | 2/2015 | Yamazaki | |
| 2007/0237911 A1 | 10/2007 | Nakano | |
| 2010/0003407 A1 | 1/2010 | Ito | |
| 2011/0069112 A1 | 3/2011 | Matsumoto et al. | |
| 2011/0227995 A1* | 9/2011 | Ikoshi | C09D 11/322 347/21 |
| 2011/0242196 A1* | 10/2011 | Okada | B41J 2/2107 347/20 |
| 2011/0242213 A1* | 10/2011 | Okada | B41J 2/2146 347/40 |
| 2012/0162307 A1 | 6/2012 | Yamazaki | |
| 2012/0262516 A1 | 10/2012 | Yamazaki et al. | |
| 2013/0050355 A1* | 2/2013 | Imamura | B41J 2/2107 347/84 |
| 2013/0241991 A1* | 9/2013 | Okada | B41J 2/2146 347/20 |
| 2013/0286118 A1* | 10/2013 | Okada | B41J 2/2107 347/100 |
| 2014/0285572 A1 | 9/2014 | Hanaoka et al. | |
| 2015/0091973 A1 | 4/2015 | Ikoshi et al. | |
| 2015/0158293 A1* | 6/2015 | Suzuki | B41J 2/04541 347/9 |
| 2016/0176188 A1 | 6/2016 | Mabuchi et al. | |
| 2017/0253754 A1 | 9/2017 | Kawaharada et al. | |
| 2020/0009880 A1* | 1/2020 | Yamazaki | B41J 11/0005 |
| 2020/0009890 A1* | 1/2020 | Yamazaki | B41J 2/01 |

FOREIGN PATENT DOCUMENTS

| | | |
|---|---|---|
| JP | H09-157560 A | 6/1997 |
| JP | H09-272826 A | 10/1997 |
| JP | H10-060342 A | 3/1998 |
| JP | H11-012516 A | 1/1999 |
| JP | 2000-503901 A | 4/2000 |
| JP | 2003-105235 A | 4/2003 |
| JP | 2006-240298 A | 9/2006 |
| JP | 2006-321876 A | 11/2006 |
| JP | 2007-152769 A | 6/2007 |
| JP | 2008-038090 A | 2/2008 |
| JP | 2009-285926 A | 12/2009 |
| JP | 2010-510357 A | 4/2010 |
| JP | 2011-057916 A | 3/2011 |
| JP | 2011-063771 A | 3/2011 |
| JP | 2011-195684 A | 10/2011 |
| JP | 2012-136572 A | 7/2012 |
| JP | 2012-136589 A | 7/2012 |
| JP | 2013-053175 A | 3/2013 |
| JP | 2014-184695 A | 10/2014 |

* cited by examiner

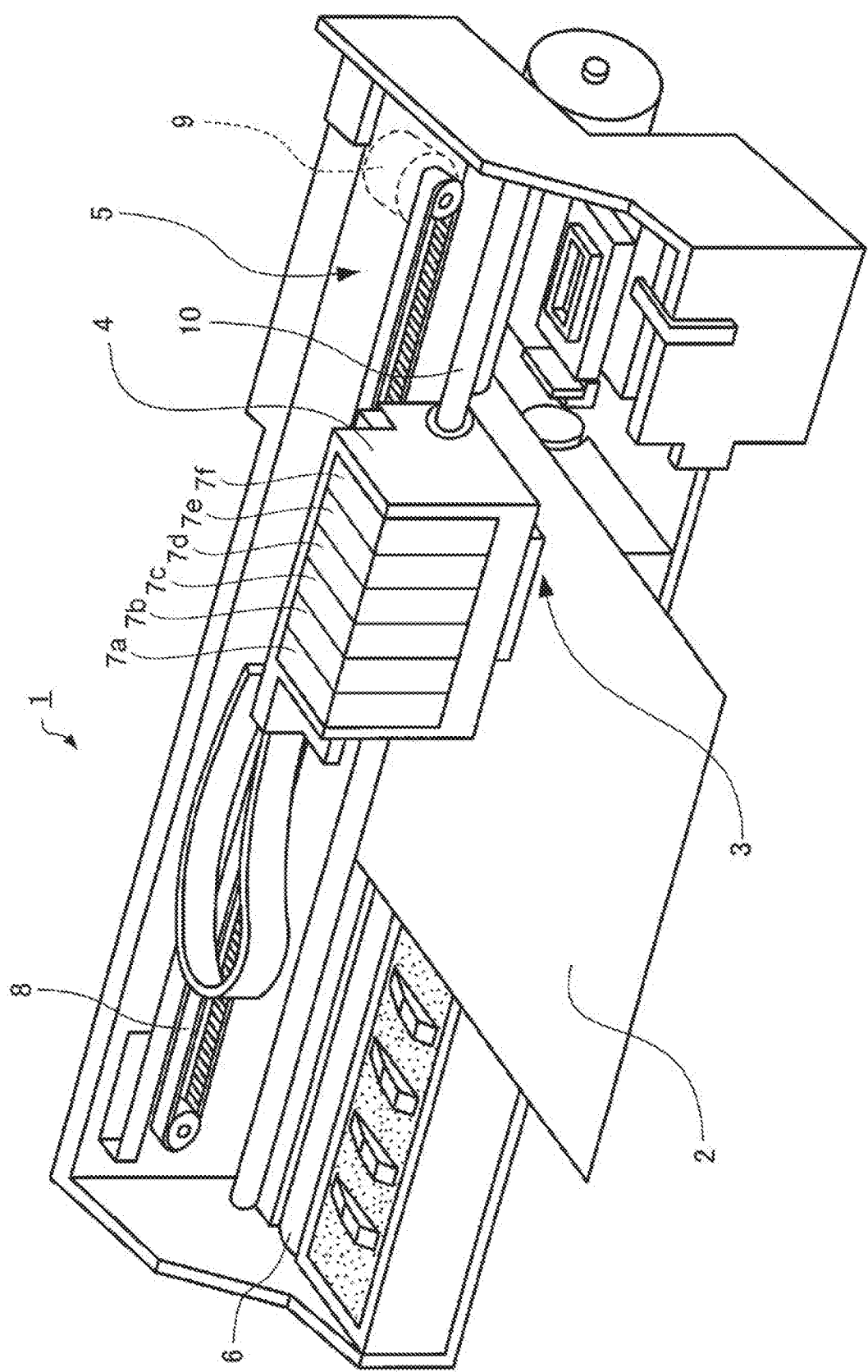

INK JET PRINTING INK COMPOSITION AND INK JET PRINTING METHOD

The present application is based on, and claims priority from JP Application Serial Number 2019-106838, filed Jun. 7, 2019, the disclosure of which is hereby incorporated by reference herein in its entirety.

BACKGROUND

1. Technical Field

The present disclosure relates to an ink jet printing ink composition and an ink jet printing method.

2. Related Art

An ink jet printer that can print information with high image quality at a high speed is desirable. When an ink jet printer prints a printing medium at a high speed, the printing medium often curls. Curled printing media are likely to jam the printer when transported and to be failed to stack up. JP-A-2011-57916 discloses an ink composition to suppress curling and cockling. The ink composition contains two specific moisturizing agents one of which is a compound selected from betaines, saccharides, and urea compounds and having a molecular weight of 100 to 200.

Unfortunately, this ink composition often causes printing sheets to curl when used for high-speed, high-density printing. Curls of printing sheets caused by an ink composition include a primary curl and a secondary curl. The primary curl is a deformation of a printing sheet curved or rounded in such a manner that the side of the sheet printed with an ink composition forms a convex surface. The secondary curl is a deformation of a printing sheet curved or rounded in such a manner that the side opposite to the printed side forms a concave surface. To reduce the formation of such curls, both primary curling and secondary curling need to be suppressed. Known ink compositions are not much effective in suppressing primary curling.

SUMMARY

Accordingly, the present disclosure provides an ink jet printing ink composition that can suppress primary and secondary curling.

The ink jet printing ink composition contains a pigment, colloidal silica, trimethylglycine, and water, and in which a content of the colloidal silica is lower than or equal to a content of the trimethylglycine.

In the ink jet printing ink composition, the content of the colloidal silica may be 2.0% to 10.0% relative to the total mass of the ink jet printing ink composition.

In the ink jet printing ink composition, a content of the trimethylglycine may be 5.0% to 20.0% relative to the total mass of the ink jet printing ink composition.

The ink jet printing ink composition may further contain a lactam solvent.

In this instance, a content of the lactam solvent may be lower than or equal to the content of the colloidal silica.

The lactam solvent may be 2-pyrrolidinone, and a content of the 2-pyrrolidinone may be 0.1% to 5.0% relative to the total mass of the ink jet printing ink composition.

The ink jet printing ink composition may contain a high-boiling organic solvent having a boiling point of 280° C. or more with a content of more than or equal to the content of the lactam solvent and less than or equal to the content of the colloidal silica.

The high-boiling organic solvent may be glycerin.

In the ink jet printing ink composition, the colloidal silica may have an average particle size of 5 nm to 100 nm.

The present disclosure also provides an ink jet printing method including ejecting the above-described ink jet printing ink composition from an ink jet head.

BRIEF DESCRIPTION OF THE DRAWINGS

The FIGURE is a schematic perspective view of an ink jet printing apparatus used in an embodiment according to the present disclosure.

DESCRIPTION OF EXEMPLARY EMBODIMENTS

Exemplary embodiments of the present disclosure will now be described in detail. The implementation of the concept of the present disclosure is not limited to the following embodiments, and various modifications may be made within the scope and spirit of the disclosure.

1. Ink Jet Printing Ink Composition

The ink jet printing ink composition disclosed herein contains a pigment, colloidal silica, trimethylglycine, and water. The ink jet printing ink composition hereinafter is often referred to simply as the ink.

1-1. Pigment

The pigment may be chromatic, black, or white or have a fluorescent color. Also, the pigment may be inorganic or organic. Examples of the pigment used in the ink jet printing ink composition disclosed herein are as follows:

Examples of the pigments that can be used in the black ink include, but are not limited to, No. 2300, No. 900, MCF88, No. 33, No. 40, No. 45, No. 52, MA7, MA8, MA100, and No. 2200B, all produced by Mitsubishi Chemical; Raven series 5750, 5250, 5000, 3500, 1255, and 700, all produced by Columbia Carbon; Regal (registered trademark) series 400R, 330R, and 660R, Mogul (registered trademark) L, and Monarch (registered trademark) series 700, 800, 880, 900, 1000, 1100, 1300, and 1400, all produced by Cabot; and Color Blacks FW1, FW2, FW2V, FW18, FW200, S150, S160, and S170, Printex (registered trademark) series 35, U, V, and 140U, and Special Blacks 6, 5, 4A, and 4, all produced by Degussa.

Examples of the pigments that can be used in the white ink include, but are not limited to, C.I. (Colour Index Generic Name) Pigment Whites 6, 18, and 21, titanium oxide, zinc oxide, zinc sulfide, antimony oxide, zirconium oxide, white hollow resin particles, and polymer particles.

Examples of the pigments that can be used in the yellow ink include, but are not limited to, C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of the pigment that can be used in the magenta ink include, but are not limited to, C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48:2, 48:5, 57:1, 88, 112, 114, 122, 123, 144, 146, 149, 150, 166, 168, 170, 171, 175, 176, 177, 178, 179, 184, 185, 187, 202, 209, 219, 224, and 245; and C.I. Pigment Violets 19, 23, 32, 33, 36, 38, 43, and 50.

Examples of the pigment that can be used in the cyan ink include, but are not limited to, C.I. Pigment Blues 1, 2, 3, 15, 15:1, 15:2, 15:3, 15:34, 15:4, 16, 18, 22, 25, 60, 65, and 66; and C.I. Vat Blues 4 and 60.

Other pigments may be used, and examples thereof include, but are not limited to, C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

The pigment to be added to the ink may be in the form of a pigment dispersion liquid or a self-dispersible pigment. The pigment dispersion liquid may be prepared by dispersing the particles of the pigment in water with a dispersant or by coating the pigment particles with a polymer and dispersing such polymer-coated pigment particles in water. The self-dispersible pigment is prepared by introducing a hydrophilic group to the surfaces of the pigment particles by a chemical reaction and dispersing such surface-treated pigment in water.

The average particle size of the pigment may be 10 nm to 300 nm. The ink composition containing such a pigment exhibits a higher color developability, produces printed items having a low wet friction, and enables satisfactory recovery from clogging. In some embodiments, the average particle size of the pigment may be 24 nm or more, for example, 40 nm or more or 65 nm or more. Also, the average particle size of the pigment may be 200 nm or less, for example, 150 nm or less or 110 nm or less.

In some embodiments, the pigment may be added in the form of a self-dispersible pigment. The particles of the self-dispersible pigment have having surfaces to which a hydrophilic group is introduced. The hydrophilic group may be, but is not limited to, —OM, —COOM, —CO—, —$SO_3M$, —$SO_2M$, —$SO_2NH_2$, —$RSO_2M$, —$PO_3HM$, —$PO_3M_2$, —$SO_2NHCOR$, —$NH_3$, or —$NR_3$. M's in some of the above-cited hydrophilic groups each independently represent a hydrogen atom, an alkali metal, ammonium, a substituted or unsubstituted phenyl group, or an organic ammonium, and R's each independently represent an alkyl group having a carbon number of 1 to 12 or a substituted or unsubstituted naphthyl group.

The self-dispersible pigment is produced by, for example, binding any of the above-cited hydrophilic groups to a pigment. For binding the hydrophilic group to a pigment, the pigment may be subjected to, for example, vacuum plasma treatment, ozone oxidation, phosphoric acid treatment, or wet oxidation with an oxidizing agent in water, or p-aminobenzoic acid may be bound to the surfaces of the pigment particles to bind the carboxy group to the surfaces with the phenyl group therebetween. The technique for binding is however not particularly limited. In some embodiments, carbon black treated by ozone oxidation or with phosphoric acid may be used as the self-dispersible pigment. Carbon black subjected to ozone oxidation may be more beneficial.

Some self-dispersible pigments are commercially available, and examples thereof include Aqua-Black (registered trademark) 162 produced by Tokai Carbon, Microjet (registered trademark) CW-1 produced by Orient Chemical Industries, and CAB-O-JET (registered trademark) series 200, 300, and 450C produced by CABOT.

Such pigments may be used individually or in combination.

The content of pigment particles may be 1.0% to 20.0% relative to the total mass of the ink. The ink containing pigment particles in such a range exhibits a higher color developability, produces printed items having a low wet friction, and enables satisfactory recovery from clogging. In some embodiments, the content of pigment particles in the ink composition may be 3.0% or more, for example, 5.0% or more, relative to the total mass of the ink. Also, the content of pigment particles may be 15.0% or less, for example, 10.0% or less, relative to the total mass of the ink.

1-2. Colloidal Silica

Colloidal silica is a colloidal solution in which silicon dioxide ($SiO_2$) is dispersed in water or an organic solvent. Colloidal silica particles are spherical and can be kept dispersed stably in an ink jet ink with a specific acid or alkali. The present inventors found that the hygroscopicity of the colloidal silica is involved in effective suppression of curling. More specifically, by adding colloidal silica to the ink, primary curling is suppressed. This effect has not been known before.

The colloidal silica used in the ink may have an average particle size of 5 nm to 100 nm. Colloidal silica having an average particle size of 100 nm or less is unlikely to settle and can be kept dispersed stably in the ink. Also, colloidal silica having an average particle size of 5 nm or more is effective in suppressing primary curling.

The average particle size of the colloidal silica can be measured with a particle size distribution analyzer based on a dynamic light scattering method. Zeta-potential & Particle Size Analyzer ELSZ-2000ZS manufactured by Otsuka Electronics, which uses a homodyne optical system for frequency analysis, is an example of such a particle size distribution analyzer. The term "average particle size" mentioned herein is on a number basis unless otherwise specified.

The colloidal silica is commercially available, and examples thereof include SI-550, SI-30P, SI-45P, and SI-80P all produced by JGC Catalysts & Chemicals and ST-30L and MP-1040 produced by Nissan Chemical Industries.

The content of the colloidal silica is appropriately determined according to the type and desired effects thereof and, in some embodiments, may be 2.0% to 10.0% relative to the total mass (100%) of the ink.

1-3. Trimethylglycine

Trimethylglycine is a chemically stable quaternary amino acid derivative and has a low molecular weight. Trimethylglycine functions as a moisturizing agent and an agent to suppress curling of the printing medium. In particular, trimethylglycine is effective in suppressing secondary curling.

The content of the trimethylglycine is equal to or higher than the content of the colloidal silica and may be 5.0% to 20.0% relative to the total mass (100%) of the ink. The trimethylglycine contained in such a proportion can favorably produce the effects of moisturizing the printing medium and suppressing secondary curling of the printing medium.

1-4. Lactam Solvent

The ink of an embodiment of the preset disclosure contains a lactam solvent. The lactam solvent in the ink acts to increase the color developability of the ink and reduce the wet friction of the printed item and, in addition, helps recovery from clogging.

Examples of the lactam solvent include, but are not limited to, N-methyl-2-pyrrolidone, N-hydroxyethyl-2-pyrrolidone, 2-pyrrolidinone, and ε-caprolactam. Such lactam solvents may be used individually or in combination. In some embodiments, 2-pyrrolidinone or ε-caprolactam may be used from the viewpoint of improving recovery from clogging. 2-Pyrrolidinone is more beneficial.

The content of the lactam solvent is lower than or equal to the content of the colloidal silica. The content of the lactam solvent may be 0.1% to 20.0%, for example, 0.1% to 10.0% or 0.1% to 5.0%, relative to the total mass of the ink. The ink containing a lactam solvent in such a proportion enables more satisfactory recovery from clogging. The content of 2-pyrrolidinone, if added as the lactam solvent, may be 0.1% to 5.0% relative to the total mass of the ink.

1-5. High-boiling Organic Solvent

The ink composition disclosed herein contains a high-boiling organic solvent having a boiling point of 280° C. or more. Glycerin is an example of the high-boiling organic solvent having a boiling point of 280° C. or more. The content of such a high-boiling organic solvent is higher than or equal to the content of lactam solvent and lower than or equal to the content of the colloidal silica. The term boiling point used herein refers to a normal boiling point.

1-6. Further Organic Solvent

In an embodiment, the ink disclosed herein may contain a further organic solvent other than the lactam solvent and the high-boiling organic solvent. The organic solvent other than the lactam solvent and the high-boiling organic solvent are hereinafter referred to as a further organic solvent. Examples of such a further organic solvent include, but are not limited to, polar aprotic solvents other than lactam solvents, monoalcohols, alkyl polyols, and glycol ethers.

Examples of polar aprotic solvents other than lactam solvents include, but are not limited to, γ-butyrolactone, 1,3-dimethyl-2-imidazolidinone, dimethyl sulfoxide, imidazole, 1-methylimidazole, 2-methylimidazole, and 1,2-dimethylimidazole.

Exemplary monoalcohols include, but are not limited to, methanol, ethanol, n-propyl alcohol, isopropyl alcohol, n-butyl alcohol, 2-butanol, tert-butyl alcohol, isobutyl alcohol, and n-pentyl alcohol, 2-pentanol, 3-pentanol, and tert-pentyl alcohol.

Exemplary alkyl polyols include, but are not limited to, ethylene glycol, diethylene glycol, triethylene glycol, propylene glycol (also called 1,2-propanediol), dipropylene glycol, 1,3-propylene glycol (also called 1,3-propanediol), isobutylene glycol (also called 2-methyl-1,2-propanediol), 1,2-butanediol, 1,3-butanediol, 1,4-butanediol, 2-butene-1,4-diol, 1,2-pentanediol, 1,5-pentanediol, 2-methyl-2,4-pentanediol, 1,2-hexanediol, 1,6-hexanediol, 2-ethyl-1,3-hexanediol, 1,7-heptanediol, and 1,8-octanediol. An alkyl polyol that is solid at 20° C., such as trimethylolpropane, may be added to the ink.

Exemplary glycol ethers include, but are not limited to, diethylene glycol mono-n-propyl ether, ethylene glycol monoisopropyl ether, diethylene glycol monoisopropyl ether, ethylene glycol mono-n-butyl ether, ethylene glycol mono-tert-butyl ether, diethylene glycol mono-n-butyl ether, triethylene glycol mono-n-butyl ether, diethylene glycol mono-tert-butyl ether, propylene glycol monomethyl ether, propylene glycol monoethyl ether, propylene glycol mono-tert-butyl ether, propylene glycol mono-n-propyl ether, propylene glycol monoisopropyl ether, propylene glycol mono-n-butyl ether, dipropylene glycol mono-n-butyl ether, dipropylene glycol mono-n-propyl ether, and dipropylene glycol monoisopropyl ether. Further organic solvents, as cited above, may be used individually or in combination.

The content of such a further organic solvent, if added, may be 1.0% to 70.0% relative to the total mass of the ink. In some embodiments, the content of the further organic solvent may be 5.0% by mass or more, for example, 10.0% by mass or more. Also, the content of the further organic solvent may be 50.0% by mass or less, for example, 30.0% by mass or less.

1-7. Water

The ink disclosed herein contains water. The water is evaporated by drying after the ink has been applied onto the printing medium. The water may be, but is not limited to, pure water or ultra-pure water in which ionic impurities are minimized. Examples of such water include ion-exchanged water, ultrafiltered water, reverse osmosis water, and distilled water. Sterile water prepared by, for example, UV irradiation or addition of hydrogen peroxide can prevent the occurrence of mold or bacteria in the ink stored for a long time. Thus, the ink can be stably preserved.

The content of water may be 10.0% to 90.0% relative to the total mass of the ink. In some embodiments, the content of the water content may be, by mass, 40.0% to 80.0% or 50.0% or more to 70.0%.

1-8. Surfactant

In some embodiments of the present disclosure, the ink may contain a surfactant from the viewpoint of consistently ejecting the ink by an ink jet printing method and appropriately controlling the permeation of the ink. The surfactant may be, but is not limited to, an acetylene glycol-based surfactant, a fluorosurfactant, or a silicone surfactant.

Examples of the acetylene glycol-based surfactant include, but are not limited to, 2,4,7,9-tetramethyl-5-decyne-4,7-diol and alkylene oxide adducts thereof, and 2,4-dimethyl-5-decyne-4-ol and alkylene oxide adducts thereof. Such surfactants may be used individually or in combination.

The acetylene glycol-based surfactant is commercially available, and examples thereof include, but are not limited to, Olefine (registered trademark) 104 and Olefine E1010 (both produced by Nissin Chemical Industry), and Surfynol (registered trademark) series 104, 465, 61, and DF110D (all produced by Evonik Industries).

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxide compounds. Such surfactants may be used individually or in combination.

The fluorosurfactant is commercially available, and examples thereof include, but are not limited to, Surflon (registered trademark) series S-144 and S-145 (both produced by AGC Seimi Chemical), FC-170C, FC-430, and FC-4430 (all produced by 3M), FSO, FSO-100, FSN, FSN-100, and FS-300 (all produced by Dupont), and FT-250 and FT-251 (both produced by Neos). Such surfactants may be used individually or in combination.

The silicone surfactant may be, but is not limited to, a polysiloxane compound or a polyether-modified organosiloxane. Such surfactants may be used individually or in combination.

The silicone surfactant is commercially available, and examples thereof include, but are not limited to, BYK (registered trademark)-306, BYK-307, BYK-333, BYK-341, BYK-345, BYK-346, BYK-347, BYK-348, and BYK-349 (all produced by BYK Additives & Instruments); and KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all produced by Shin-Etsu Chemical).

The surfactants cited above may be used individually or in combination. In some embodiments, acetylene glycol-based surfactants are beneficially used.

The content of the surfactant, if added to the ink, may be 0.1% to 5.0%, for example, 0.2% to 3.0% or 0.2% to 1.0%, relative to the total mass of the ink.

1-9. Other Constituents

The ink composition disclosed herein may further contain other constituents as additives, and examples thereof include a pH adjuster, such as potassium hydroxide, triethanolamine, or isopropanol amine, resin particles, a solubilizing agent, a viscosity modifier, an antioxidant, a preservative/fungicide, a fungicide, a corrosion inhibitor, and a chelating agent capable of trapping metal ions that affects dispersion, such as sodium ethylenediaminetetraacetate.

The ink disclosed herein can be prepared by mixing the above-described constituents in a desired order and, optionally, removing impurities by, for example, filtration. For mixing, the constituents may be added one after another into a container equipped with a stirring device, such as a mechanical stirrer or a magnetic stirrer, and are stirred in the container. For removing impurities, centrifugation or filtration may be employed.

1-10. Physical Properties of the Ink

The physical properties of the ink are controlled according to the use of the ink and the type of the printing medium. The printing medium will be described later herein.

The viscosity of the ink at 20° C. may be controlled in the range of 1.0 mPa·s to 30.0 mPa·s, for example, 1.5 mPa·s to 20 mPa·s. The quotient of the viscosity measured at 20° C. and a shear rate of 10 $s^{-1}$ divided by the viscosity measured at 20° C. and a shear rate of 1000 $s^{-1}$ is 1.0 to 1.2. The viscosity of the ink can be measured with, for example, a viscoelasticity meter MCR-300 manufactured by Pysica.

The surface tension at 25° C. of the ink may be controlled in the range of 10 mN/m to 40 mN/m. In some embodiments, the surface tension may be 20 mN/m to 40 mN/m or 20 mN/m to 35 mN/m. The ink having a surface tension in such a range at 25° C. can be consistently ejected from an ink jet head by and ink jet method. Also, such an ink can form high-definition images on the printing medium. The surface tension may be measured with, for example, a surface tensiometer CBVP-Z manufactured by Kyowa Interface Science. More specifically, the surface tension may be measured by dipping a part of a platinum plate in the ink at 25° C.

2. Ink Jet Printing Method

The ink jet printing method disclosed herein includes an ink application step of applying the ink according to an embodiment of the present disclosure onto a printing medium by ejecting the ink from an ink jet head. Such an ink jet printing method can produce printed items with highly developed colors while suppressing curling.

The printing medium may be, but is not limited to, plain paper, such as electrophotographic paper having high ink permeability; ink jet paper having an ink absorbing layer containing silica particles or alumina particles or an ink absorbing layer made of a hydrophilic polymer, such as polyvinyl alcohol (PVA) or polyvinyl pyrrolidone (PVP); or paper having relatively low ink permeability used for ordinary offset printing, such as art paper, coat paper, or cast-coated paper.

In the ink application step, the ink may be ejected at a rate of 3.6 mg/inch$^2$ or more. Since the ink jet printing method uses the ink of an embodiment of the present disclosure, high color development can be achieved. Consequently, the printed item has a sufficient optical density even if the ink ejection rate is as mentioned above; hence, the amount of ink to be used for printing can be reduced to reduce environmental load. Also, the ink ejection rate may be 6.0 mg/inch$^2$ or less, for example, 5.0 mg/inch$^2$ or less, 4.5 mg/inch$^2$ or less, or 4.0 mg/inch$^2$ or less. When the ink is ejected at a rate in such a range, the resulting printed item has a sufficient optical density, whereas the amount of ink used in the ink jet printing method is reduced.

The ink jet printing method may further include a heating step of heating the printing medium to help dry the ink at a time before, during, or after printing operation or throughout the printing operation. The heating device used for the heating step is beneficially, but not limited to, a device capable of temperature control, and such heating devices include a radiation type sheathed heater, infrared radiation heater, a contact type sheet heater, and an electromagnetic wave heater. The surface temperature of the heated printing medium may be 40° C. to 80° C. The ink jet printing method may further include an air blowing step using a fan or the like.

The ink jet printing method disclosed herein may further include any other known steps that may be used in the known ink jet printing method.

As described above, the ink jet printing ink composition and the ink jet printing method according to the present disclosure produce the following effects.

Primary and secondary curling are both suppressed. The colloidal silica suppresses primary curling, and the trimethylglycine suppresses secondary curling. The trimethylglycine surrounds the colloidal silica particles to form protective colloids. Therefore, primary and secondary curling are both suppressed by controlling the content of the colloidal silica to less than or equal to the content of the trimethylglycine. Thus, the ink jet printing ink composition can suppress primary and secondary curling.

3. Ink Jet Printing Apparatus

An ink jet printing apparatus used in an embodiment of the present disclosure will now be described with reference to the FIGURE. The ink jet printing apparatus is intended for use in an ink jet printing method that is performed by ejecting ink droplets onto a printing medium. The FIGURE is a schematic perspective view of an ink jet printing apparatus used in an embodiment of the present disclosure. In the following embodiment, an on-carriage printer, which is a type of printing apparatus in which the ink cartridge is mounted on a carriage, will be described by way of example. For the sake of visual clarity, the dimensional proportions of the components of the apparatus in the FIGURE are varied from those in practice.

A printer 1 used in the present embodiment is what is called a serial printer. Serial printers are of a type of printer provided with an ink jet head on a carriage movable in a predetermined direction. The ink jet head is configured for printing while being moved with the movement of the carriage.

As shown in the FIGURE, the printer 1 includes an ink jet head 3, a carriage 4, a main scan mechanism 5, a platen roller 6, and a control unit (not shown) to control the general operation of the printer 1. The carriage 4 holds the ink jet head 3 and removable ink cartridges 7a, 7b, 7c, 7d, 7e, and 7f individually containing an ink to be fed to the ink jet head 3.

The main scan mechanism 5 includes a timing belt 8 connected to the carriage 4, a motor 9 operable to drive the timing belt 8, and a guide shaft 10. The guide shaft 10 is a member to hold the carriage 4 and extends in the direction in which the carriage 4 moves (main scanning direction). The carriage 4 is moved along the guide shaft 10 by the timing belt 8 driven by the motor 9. Thus, the main scan mechanism reciprocally moves the carriage 4 in the main scanning direction.

The platen roller 6 is operable to transport a printing sheet 2 to be printed in a sub-scanning direction perpendicular to the main scanning direction (in the longitudinal direction of the printing sheet 2). Hence, the printing sheet 2 is transported in the sub-scanning direction. Also, the carriage 4, on which the ink jet head 3 is mounted, can move reciprocally in the main scanning direction that is substantially parallel to the width direction of the printing sheet 2. Accordingly, the ink jet head 3 can scan the printing sheet 2 in the main scanning direction and the sub-scanning direction.

The ink cartridges 7a, 7b, 7c, 7d, 7e, and 7f are six independent cartridges. These cartridges 7a, 7b, 7c, 7d, 7e, and 7f contain respective inks according to an embodiment of the present disclosure. The ink cartridges individually contain an ink having a color, such as black, cyan, magenta, yellow, white, or orange, and the colors of the inks are selected according to the desired combination. In the illustrated embodiment, the number of ink cartridges is 6 but is not limited to 6. The bottom of each of the ink cartridges 7a, 7b, 7c, 7d, 7e, and 7f is provided with a supply port (not shown) through which the ink contained in the ink cartridge is fed to the ink jet head 3.

The ink jet head 3 has a nozzle face (not shown) opposing the printing sheet 2. The nozzle face has nozzle lines (not shown) arranged corresponding to the color inks. The nozzle line corresponding to each color ink has a plurality of nozzles. Each color ink is fed to the ink jet head 3 from the corresponding ink cartridge and ejected in the form of droplets by an actuator (not shown) in the ink jet head 3. The ejected ink droplets land on the printing sheet 2, thus forming an image, a text, a pattern, or a color in the printing region of the printing sheet 2.

In the disclosed embodiment, the ink jet head 3 uses piezoelectric elements as an actuator. However, the actuator of the ink jet head is not limited to such elements. In an embodiment, the ink jet head may use electromechanical conversion elements that cause electrostatic suction to deform a vibration plate acting as an actuator, or electrothermal conversion elements that cause air bubbles formed by heating to eject the ink in the form of droplets.

In the embodiment disclosed herein, an on-carriage printer 1 is used as the ink jet printing apparatus in the disclosed embodiment. In an embodiment, however, a printing apparatus of another type may be used without particular limitation. For example, an off-carriage printer may be used in which ink cartridges or any other ink containers are not mounted on a carriage. The ink jet printing apparatus used in the embodiments of the present disclosure is not necessarily limited to a serial printer and may be a line head printer including an ink jet head extending across the width of the printing sheet 2 for static printing.

4. Examples and Comparative Examples

The above-described embodiment of the present disclosure will now be further described in detail with reference to Examples. However, the implementation of the present disclosure is not limited to the Examples.

4-1. Preparation of Inks

The Table presents the compositions of the inks and evaluation results of the Examples 1 to 8 and Comparative Examples 1 to 5. Examples 1 to 8 may be collectively referred to as the Examples, and Comparative Examples 1 to 5 may be collectively referred to as the Comparative Examples. After the constituents presented in the Table were mixed and stirred for 2 hours, the mixture was filtered through a membrane filter of 5 μm in pore size. Thus, the inks of the Examples and the Comparative Examples were prepared.

TABLE

| | | Example 1 | Example 2 | Example 3 | Example 4 | Example 5 | Example 6 | Example 7 |
|---|---|---|---|---|---|---|---|---|
| Colloidal silica | SI-30P | — | — | — | — | 2.0 | 5.0 | 7.0 |
| | SI-45P | 7.0 | 5.0 | 2.0 | 10.0 | — | — | — |
| Pigment | Aqua-Black 162 | 7.0 | 7.0 | 7.0 | 7.0 | 7.0 | 7.0 | 7.0 |
| Surfactant | Olfine E1010 | 0.5 | 0.5 | 0.5 | 0.5 | 0.5 | 0.5 | 0.5 |
| | Surfynol 104 | 0.5 | 0.5 | 0.5 | 0.5 | 0.5 | 0.5 | 0.5 |
| Lactam solvent | 2-Pyrrolidinone | 3.0 | 2.0 | 1.0 | 4.0 | 6.0 | 6.0 | 5.0 |
| Trimethylglycine | | 15.0 | 5.0 | 10.0 | 20.0 | 10.0 | 5.0 | 20.0 |
| High-boiling organic solvent | Glycerin | 6.0 | 8.0 | 10.0 | 4.0 | 5.0 | 5.0 | 5.0 |
| Further solvent | Butyl triglycol | 2.0 | 2.0 | 2.0 | 2.0 | 2.0 | 2.0 | 2.0 |
| pH adjuster | Triisopropanolamine | 0.5 | 0.5 | 0.5 | 0.5 | 0.5 | 0.5 | 0.5 |
| Ion-exchanged water | | Balance | Balance | Balance | Balance | Balance | Balance | Balance |
| Evaluation results | Primary curling | A | B | B | A | B | B | A |
| | Secondary curling | A | B | A | A | B | A | B |
| | Recovery from clogging | A | A | A | B | A | B | B |

| | | Example 8 | Comparative Example 1 | Comparative Example 2 | Comparative Example 3 | Comparative Example 4 | Comparative Example 5 |
|---|---|---|---|---|---|---|---|
| Colloidal silica | SI-30P | 10.0 | — | — | — | — | — |
| | SI-45P | — | — | 1.0 | 7.0 | — | 11.0 |
| Pigment | Aqua-Black 162 | 7.0 | 7.0 | 7.0 | 7.0 | 7.0 | 7.0 |
| Surfactant | Olfine E1010 | 0.5 | 0.5 | 0.5 | 0.5 | 0.5 | 0.5 |
| | Surfynol 104 | 0.5 | 0.5 | 0.5 | 0.5 | 0.5 | 0.5 |
| Lactam solvent | 2-Pyrrolidinone | — | 6.0 | 6.0 | 3.0 | 7.0 | 6.0 |
| Trimethylglycine | | 15.0 | 21.0 | — | 5.0 | — | 4.0 |
| High-boiling organic solvent | Glycerin | 9.0 | 4.0 | 4.0 | 6.0 | 10.0 | 4.0 |
| Further solvent | Butyl triglycol | 2.0 | 2.0 | 2.0 | 2.0 | 2.0 | 2.0 |
| pH adjuster | Triisopropanolamine | 0.5 | 0.5 | 0.5 | 0.5 | 0.5 | 0.5 |

TABLE-continued

| | | | | | | | |
|---|---|---|---|---|---|---|---|
| Ion-exchanged water | | Balance | Balance | Balance | Balance | Balance | Balance |
| Evaluation results | Primary curling | A | D | C | B | C | B |
| | Secondary curling | A | B | D | C | D | C |
| | Recovery from clogging | B | C | A | B | A | C |

The constituents presented in the Table are as follows:
Colloidal Silica
SI-30P produced by JGC Catalysts & Chemicals, average particle size: 10 nm
SI-45P produced by JGC Catalysts & Chemicals, average particle size: 45 nm
Pigment
Aqua-Black 162 produced by Tokai Carbon, average particle size: 110 nm
Surfactant
Olfine E1010 produced by Nissin Chemical Industry
Surfynol 104 produced by Evonik Industries
Lactam Solvent
2-Pyrrolidinone
Trimethylglycine
Trimethylglycine produced by Tokyo Chemical Industry
High-boiling organic solvent having a boiling point of 280° C. or more
Glycerin
Further organic solvent
Butyl triglycol (also called triethylene glycol monobutyl ether)
pH Adjuster
Triisopropanolamine The values presented in the Table is represented by percent by mass. The sign "–" without any value in the Table implies that the ink did not contain the material. The "balance" of the ion-exchanged water implies that ion-exchanged water was added so that the total mass would be 100% by mass. The pigment was used in the form of a pigment dispersion liquid that was prepared by a known method, and the content of the pigment presented in the Table is the solid content of the pigment dispersion liquid, corresponding to the pigment content.

4-2. Examination

The ink cartridge of an EPSON PX-S7050 was charged with the ink presented in the Table. The Table also presents evaluation results. Examinations performed for evaluation will be described below.

Primary Curling

The cartridge containing any of the inks was mounted in the printer (PX-S7050), and a solid pattern was printed on a postcard-size Xerox P sheet (copy paper as the printing medium with a basis weight of 64 g/m² and a thickness of 88 μm, manufactured by Fuji Xerox) at a print density of 100% under the conditions of 25° C. in temperature and 50% in humidity. The resulting printed sample was allowed to stand in a face-down position on a table. At this time, angles of the imaginary line segments from the contact point of the sheet with the table to the ends of the sheet were measured with respect to the surface of the table as an indicator of the primary curl.

Criteria
  A: The largest angle of the curl was less than 90°.
  B: The largest angle of the curl was 90° to less than 100°.
  C: The largest angle of the curl was 100° to less than 110°.
  D: The largest angle of the curl was more than 110°.

Secondary Curling

The cartridge containing any of the inks was mounted in the printer (PX-S7050), and a solid pattern was printed on a A4-size Xerox P sheet (copy paper as the printing medium with a basis weight of 64 g/m² and a thickness of 88 μm, manufactured by Fuji Xerox) at a print density of 100% under the conditions of 25° C. in temperature and 50% in humidity. The resulting printed sample was allowed to stand in a face-up position on a table for 2 weeks, and the distance between an end of the sheet away from the surface of the table and the surface was measured as an indicator of the secondary curl.

Criteria
  A: The distance was less than 10 mm.
  B: The distance was 10 mm to less than 20 mm.
  C: The distance was 20 mm to less than 30 mm.
  D: The distance was more than 30 mm.

Recovery from Clogging

After the printing for the examination of the secondary curling, the ink jet head was allowed to stand at a position away from the capping position, that is, over the platen, in the environment of 40° C. in temperature and 20% in humidity. Then, the number of times of cleaning was counted until the ink could be properly ejected through all the nozzles.
  A: less than 6 times of cleaning
  B: 6 times to less than 9 times of cleaning
  C: Proper ejection was not recovered even by 9 times or more of cleaning.

As shown in the Table, the inks of Examples 1 to 8, which contained colloidal silica and trimethylglycine in such a proportion that the content of the colloidal silica was lower than or equal to the content of the trimethylglycine, suppressed the primary and secondary curling compared to the inks of Comparative Examples 1 to 5.

The comparison between the results of Example 1 and Comparative Example 1 suggests that the ink according to the present disclosure containing colloidal silica and satisfying a specific condition and the ink jet printing method disclosed herein using such an ink can suppress primary curling and enable satisfactory recovery from clogging.

The comparison between the results of Example 1 and Comparative Example 2 suggests that the ink containing trimethylglycine and satisfying a specific condition can suppress primary and secondary curling.

The comparison between the results of Example 1 and the results of Comparative Examples 3 and 5 suggests that the ink containing colloidal silica and trimethylglycine in such a proportion that the content of the colloidal silica is lower than or equal to the content of the trimethylglycine can suppress curling effectively and enable satisfactory recovery from clogging.

The comparison between the results of Example 1 and the results of Comparative Example 4 suggests that the ink containing colloidal silica and trimethylglycine and satisfying a specific condition can suppress curling effectively.

The results of Examples 1 to 8 suggest that the ink containing colloidal silica and trimethylglycine in such a proportion that the content of the colloidal silica is lower than or equal to the content of the trimethylglycine can suppress curling effectively and enable satisfactory recovery from clogging even though the particle size of the colloidal silica is varied.

The results of Examples 3 and 5 suggest that the ink satisfying a specific condition can suppress curling effectively and enable satisfactory recovery from clogging even though the content of the colloidal silica is around the lower limit.

The results of Examples 4 and 8 suggest that the ink satisfying a specific condition can suppress curling effectively and enable satisfactory recovery from clogging even though the content of the colloidal silica is around the upper limit.

The results of Examples 2 and 6 suggest that the ink satisfying a specific condition can suppress curling effectively and enable satisfactory recovery from clogging even though the content of the trimethylglycine is around the lower limit.

The results of Examples 4 and 7 suggest that the ink satisfying a specific condition can suppress curling effectively and enable satisfactory recovery from clogging even though the content of the colloidal silica is around the upper limit.

In contrast, the inks of Comparative Examples 1 and 4, which did not contain colloidal silica, did not sufficiently suppress primary curling.

The inks of Comparative Examples 2 and 4, which did not contain trimethylglycine, did not sufficiently suppress secondary curling.

The inks of Comparative Examples 3 and 5, which contained colloidal silica with a content of more than or equal to the content of the trimethylglycine, did not sufficiently suppress secondary curling.

The following are derived from the embodiments of the present disclosure.

The ink jet printing ink composition disclosed herein contains a pigment, colloidal silica, trimethylglycine, and water, and in which the content of the colloidal silica is lower than or equal to the content of the trimethylglycine.

Such an ink composition can suppress primary and secondary curling. The colloidal silica suppresses primary curling, and the trimethylglycine suppresses secondary curling. More specifically, colloidal silica suppresses the permeation of the liquid component into the printing medium, thus suppressing primary curing. Trimethylglycine can retain moisture, and this characteristic is effective in suppressing secondary curling. However, trimethylglycine surrounds colloidal silica particles to form protective colloids. If the content of the trimethylglycine is lower than the content of the colloidal silica, trimethylglycine cannot sufficiently suppress secondary curling. Therefore, the content of the colloidal silica is controlled to less than or equal to the trimethylglycine so that primary and secondary curling can be suppressed. Thus, the ink jet printing ink composition can suppress primary and secondary curling.

In the ink jet printing ink composition, the content of the colloidal silica may be 2.0% to 10.0% relative to the total mass of the ink jet printing ink composition.

The colloidal silica with such a content is more effective in suppressing primary curling. In addition, the ink jet head can recover readily from the clogging with such an ink jet printing ink composition.

In the ink jet printing ink composition, the content of the trimethylglycine may be 5.0% to 20.0% relative to the total mass of the ink jet printing ink composition.

The trimethylglycine with such a content is more effective in suppressing secondary curling. In addition, the ink jet head can recover readily from the clogging with such an ink jet printing ink composition.

The ink jet printing ink composition may further contain a lactam solvent.

The lactam solvent in the ink is more soluble than other organic solvents and has a low viscosity, accordingly helping recovery from clogging.

In this instance, the content of the lactam solvent may be lower than or equal to the content of the colloidal silica.

Such an ink jet printing ink composition is more effective in suppressing primary curling. In addition, the ink jet head can recover readily from the clogging with such an ink jet printing ink composition.

The lactam solvent may be 2-pyrrolidinone, and a content of the 2-pyrrolidinone may be 0.1% to 5.0% relative to the total mass of the ink jet printing ink composition.

Such an ink jet printing ink composition is more effective in suppressing secondary curling. In addition, the ink jet head can recover readily from the clogging with such an ink jet printing ink composition.

The ink jet printing ink composition may contain a high-boiling organic solvent having a boiling point of 280° C. or more with a content of more than or equal to the content of lactam solvent and less than or equal to the content of colloidal silica.

Such a high-boiling organic solvent in the ink hinders the ink component from forming aggregates, thereby reducing the failure of nozzle ejection and helping recovery from clogging.

The high-boiling organic solvent may be glycerin.

Glycerin can retain moisture, and this characteristic is effective in suppressing secondary curling.

In the ink jet printing ink composition, the colloidal silica may have an average particle size of 5 nm to 100 nm.

Colloidal silica having an average particle size of 100 nm or less is unlikely to settle and can be kept dispersed stably in the ink. Also, colloidal silica having an average particle size of 5 nm or more helps suppress primary curling more effectively.

The ink jet printing method disclosed herein includes ejecting the above-described ink jet printing ink composition from an ink jet head.

This ink jet printing method can suppress primary and secondary curling.

What is claimed is:

1. An ink jet printing ink composition comprising:
   a pigment;
   colloidal silica, the colloidal silica having an average particle size of 45 nm to 100 nm;
   a lactam solvent;
   a high-boiling organic solvent having a boiling point of 280° C. or more;
   trimethylglycine; and
   water,
   wherein a content of the colloidal silica is lower than or equal to a content of the trimethylglycine;
   a content of the lactam solvent is lower than or equal to the content of the colloidal silica;
   a content of the high-boiling organic solvent is greater than or equal to the content of the lactam solvent and lower than or equal to the content of the colloidal silica;
   the high-boiling organic solvent includes glycerin, and the content of the colloidal silica is 2.0% to 10.0% relative to the total mass of the ink jet printing ink composition.

2. The ink jet printing ink composition according to claim 1, wherein the content of the colloidal silica is 2.0% to 7.0% relative to the total mass of the ink jet printing ink composition.

3. The ink jet printing ink composition according to claim 1, wherein the content of the trimethylglycine is 5.0% to 20.0% relative to the total mass of the ink jet printing ink composition.

4. The ink jet printing ink composition according to claim 1, wherein the lactam solvent is 2-pyrrolidinone, and a content of the 2-pyrrolidinone is 0.1% to 5.0% relative to the total mass of the ink jet printing ink composition.

5. An ink jet printing method comprising:
ejecting the ink jet printing ink composition as set forth in claim 1 from an ink jet head.

6. The ink jet printing ink composition according to claim 1, wherein the content of the trimethylglycine is 5.0% to 10.0% relative to the total mass of the ink jet printing ink composition.

\* \* \* \* \*